United States Patent Office 3,052,649
Patented Sept. 4, 1962

3,052,649
STYRENE COPOLYMERS
Katashi Oita, Longview, Wash., and Emil F. Jason, Chicago, Ill., assignors to Standard Oil Company, Chicago, Ill., a corporation of Indiana
No Drawing. Filed May 27, 1960, Ser. No. 32,128
4 Claims. (Cl. 260—45.5)

The present invention relates to new copolymerization products of styrene and to processes for their preparation.

Polystyrene is a valuable and useful article of commerce, but its industrial applications are to a great extent limited by its lack of adequate resistance to burning. The inherent flammability of polystyrene limits its use in many applications, particularly as a construction material in homes where the danger of fire poses a constant hazard and source of worry to the inhabitants.

An object of the present invention is to provide polymerization products of styrene which have improved resistance to flammability as compared with polystyrene itself. A further object is to provide novel copolymers of styrene which can be compounded or blended with ordinary polystyrene to provide polystyrene compositions of reduced flammability. Another object of the invention is to provide processes for the production of fire-resistant copolymers of styrene.

These and other objects hereinafter disclosed are provided by the following invention in which there are provided copolymers of styrene and hexachlorocyclopentadiene. Hexachlorocyclopentadiene is a commercially available, highly chlorinated cyclic diene which we have found can be polymerized conjointly with styrene to provide solid compositions of unusual resistance to flammability. It has been found that useful products may be prepared by the copolymerization of from about 75 to 25 parts by weight of hexachlorocyclopentadiene and 25 to 75 parts of styrene.

The copolymers of our invention are high molecular weight resinous solids, and are to be distinguished from the known Diels-Alder adducts of styrene and hexachlorocyclopentadiene described, for example in U.S. Patent No. 2,606,910 of Simon H. Herzfeld et al. and U.S. Patent No. 2,673,172 of Polen et al. These known adducts of styrene and hexachlorocyclopentadiene are crystalline, low melting solids melting at 73–76° C. and comprise essentially 1:1 molar addition compounds of the respective unsaturated compound and dienophile. The polymeric products of our invention, on the other hand, are resinous solids of high molecular weight and are obtained by an entirely different mode of chemical reaction, namely, by polymerization rather than by adduction.

The present copolymers are characterized by possessing valuable flame-resistant properties, particularly by exhibiting a pronounced ability to withstand ignition. If ignited by direct application of a flame, they do not support combustion but are immediately self-extinguishing on removal of the source of flame. In spite of the resistance to flammability, the present products can be molded by compression or injection methods to give molded articles useful for a variety of purposes.

For most purposes, the copolymers as produced by polymerizing a mixture of styrene and hexachlorocyclopentadiene are generally employed as such for molding products without the presence of plasticizing agents. However, for certain purposes the copolymers may be plasticized without seriously impairing certain of the desirable properties of the copolymers. Various known stabilizers may be incorporated in the copolymer composition to provide thermal and light stability.

Polymerization of the mixtures of styrene and hexachlorocyclopentadiene can be carried out by any of the usual methods of polymerization, i.e. they can be polymerized in mass, in aqueous emulsion and in solutions. Because, as aforesaid, styrene and hexachlorocyclopentadiene can react to form a Diels-Alder adduct, it is necessary to effect polymerization at a temperature sufficiently high to obtain reasonable polymerization rates, yet not so high as to result in excessive formation of the undesired Diels-Alder adduct. We have found that temperatures from about 0° to about 100° C., preferably between about 25° and 60° C. can be used.

In order to promote the polymerization reaction at the expense of the Diels-Alder reaction, the polymerization is carried out in the presence of a polymerization catalyst, e.g. an oxygen-liberating or a free radical-liberating agent. From 0.01 to 10.0 percent, preferably 0.1 to 2 percent of the catalyst, based on the total weight of monomer mixture is advantageously employed. Examples of suitable catalysts are benzoyl peroxide, potassium persulfate, tert-butyl hydroperoxide or an azo compound such as alpha, alpha'-azodiisobutylronitrile. Usually it is desirable to use a catalyst which is soluble in the polymerization medium. Thus, in an aqueous medium, hydrogen peroxide, sodium percarbonate, sodium perborate or other alkali metal salts of a peroxy acid may be used. In a non-aqueous system, peroxides such as benzoyl peroxide, acetyl peroxide or other organic peroxidic compounds may be more suitable.

When the copolymers are formed by emulsion polymerization methods, the monomers are mixed in an aqueous medium and the copolymers prepared in aqueous suspension, generally in the presence of an emulsifying agent and advantageously in the presence of a dispersing agent to prevent agglomeration of the copolymers during the reaction. Suitable emulsifying agents which can be used are soap, salts of the sulfonated alkylbenzenes, triethanol amine salts and other similar compounds known to be effective for this purpose.

Emulsion polymerizations may be initiated by mixing the monomers and subjecting the mixture to polymerization conditions in the presence of water and catalyst. If desired, continuous polymerization methods may be used. When the reaction is completed the product in the form of an aqueous emulsion or suspension of minute solid particles is advantageously treated with a salt, an acid or an alcohol to destroy the emulsion and coagulate the copolymer in the form of a latex.

The precipitated product can be washed free of adherent salts, catalyst and the like by treatment with water, alcohol and/or hydrocarbon solvents. Excess unreacted hexachlorocyclopentadiene as well as by-product adducts of styrene and hexachlorocyclopentadiene are removed from the polymer by such treatment, and the purified polymer thus obtained is finally freed of solvents and dried, to give a commercially useful polymeric product.

In the emulsion polymerization of styrene and hexachlorocyclopentadiene in the presence of free-radical liberating catalysts, we have found that styrene is a far more reactive monomer than hexachlorocyclopentadiene, and that the composition of copolymers produced from styrene-hexachlorocyclopentadiene mixtures is not identical with the composition of the monomer mixture. For optimum flame resistance, the preferred copolymers of our invention contain from about 2 to 10% by weight of chlorine, corresponding to a hexachlorocyclopentadiene content from about 2% to about 15% by weight in the polymer chain. Polymerization of monomer mixtures containing from about 25 to 75 parts by weight of hexachlorocyclopentadiene and 75 to 25 parts styrene have been found suitable for the preparation of copolymers having the desired chlorine content.

The invention is illustrated, but not limited, by the following example:

A reaction flask was charged with 200 parts by weight of distilled water containing 1.0 part of potassium persulfate. To this was added 50 parts monomeric styrene and 50 parts hexachlorocyclopentadiene. The mixture was heated to 60° C. with vigorous stirring and maintained at this temperature with stirring for 16 hours. The emulsified product was then coagulated by adding a 1:1 mixture of ethanol and 10% aqueous sodium chloride solution. The solution was decanted from the precipitated polymer, and the polymer washed several times with ethanol and finally with heptane. After drying at 85° C. under vacuum, the polymeric product, obtained in an amount of 20.7 parts, was analyzed and found to contain 5.9% by weight chlorine. The chlorine analysis indicated that the copolymer consisted of 92 weight percent styrene and 8 weight percent hexachlorocyclopentadiene.

Addition of water to the ethanol which was used to wash the crude polymer resulted in precipitation of 17.7 parts of a product which had a melting point (recrystallized from ethanol) of 74-75° C. and was determined to be the Diels-Alder adduct of styrene and hexachlorocyclopentadiene.

The copolymer obtained in Example 1 was a clear, brittle plastic which softened at 118° C. It was ignitable, but self-extinguishing.

The copolymers of our invention may be used as such in applications which are well-known for ordinary polystyrene, such as the production of molded and extruded objects, or the like. The copolymers can advantageously be blended with ordinary polystyrene to give compositions having improved flammability resistance as compared to ordinary polystyrene. For this purpose, mixtures of polystyrene and styrene-hexachlorocyclopentadiene copolymers containing from about 25 to about 95% by weight polystyrene, the remainder being copolymer, may be prepared by conventional methods, as by dry-blending, milling, or the like, and the resultant compositions employed in various known applications in which polystyrene has hitherto been employed. It will be apparent to those skilled in the art that the copolymers or blends containing the copolymers of our invention may be compound with various known plasticizers, fillers, coloring agents, extruding aids, stabilizers and the like for the preparation of plastic compositions having particularly desirable physical properties.

We claim:

1. A copolymer of 85-98% by weight of styrene and from about 2 to 15 percent of hexachlorocyclopentadiene.

2. The process of forming a styrene copolymer which comprises heating a mixture of from about 25 to about 75% by weight of styrene and from about 75 to about 25% of hexachlorocyclopentadiene in the presence of a free-radical liberating polymerization catalyst under polymerization reaction conditions including a temperature between about 0° C. and 100° C. and recovering said copolymer from the resulting product.

3. The process of claim 2 wherein heating is effected in an aqueous medium in the presence of a free-radical liberating polymerization catalyst, selected from the group consisting of hydrogen peroxide, sodium percarbonate, sodium perborate and potassium persulfate.

4. A fire-resistant polymer composition consisting of from 25 to 95% by weight polystyrene and from 75 to 5% by weight of a copolymer as claimed in claim 1, said copolymer containing from about 2 to about 10% by weight chlorine in the molecule.

References Cited in the file of this patent
UNITED STATES PATENTS 2,439,213   Kispersky _____ Apr. 6, 1948
2,606,910   Herzfeld _____ Aug. 12, 1952

OTHER REFERENCES

"Industrial and Engineering Chem.," vol. 46, August 1954, pp. 1628-32.

Robitschek et al.: "Chemical Abstracts," October 1954, vol. 48, p. 25459d.